Feb. 25, 1964 P. C. DIMITRACOPOULOS ETAL 3,122,054
AUDIOVISUAL PROJECTION SYSTEM
Filed July 3, 1961 5 Sheets-Sheet 1
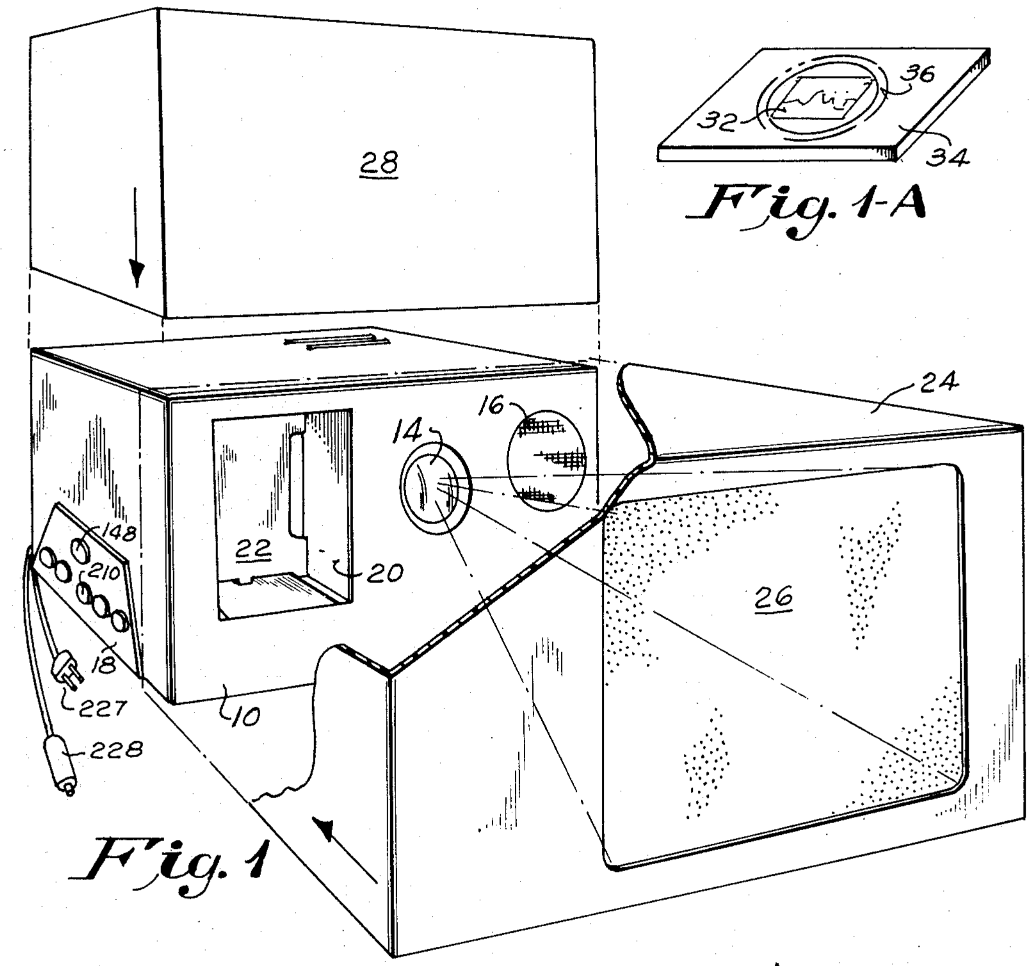
Fig. 1-A, Fig. 1
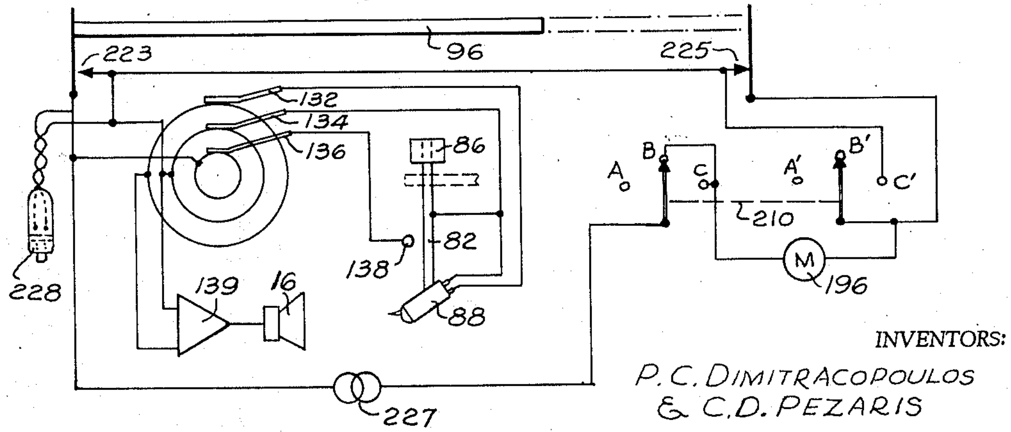
Fig. 10
INVENTORS:
P. C. DIMITRACOPOULOS
& C. D. PEZARIS
BY Homer R. Montague
ATTORNEY Feb. 25, 1964 P. C. DIMITRACOPOULOS ET AL 3,122,054

AUDIOVISUAL PROJECTION SYSTEM

Filed July 3, 1961 5 Sheets-Sheet 3

AUDIOVISUAL PROJECTION SYSTEM

Feb. 25, 1964 P. C. DIMITRACOPOULOS ETAL 3,122,054

AUDIOVISUAL PROJECTION SYSTEM

Filed July 3, 1961 5 Sheets-Sheet 5

3,122,054
Patented Feb. 25, 1964

3,122,054

AUDIOVISUAL PROJECTION SYSTEM

Panayotis C. Dimitracopoulos, 2164 Sherbrooke St. W., and Constantine D. Pezaris, 2240 Lavallee St., both of Montreal, Quebec, Canada Filed July 3, 1961, Ser. No. 121,734
11 Claims. (Cl. 88—28)

This invention has to do with audiovisual projection systems, and in particular to systems of this kind in which individual slide elements or units incorporate both a projectable optical representation or image, either as a monochrome or color projection positive, and a sound record in the form of a spiral sound track, groove or the like. The invention also comprehends apparatus of novel construction which facilitates the simultaneous optical projection of the visual image from such a slide or unit, and the aural reproduction of the accompanying sounds.

The invention will be described herein by reference to certain presently preferred specific embodiments thereof, with regard to the construction of the apparatus employed for projection. However, it will be understood by those skilled in the art that the principles of the invention can be carried out by specifically different physical devices, both as to the nature of the information records and the projection equipment; and that in using words of limited meaning for the better understanding of the particulars of the forms chosen for description and illustration, it is not intended to exclude variations of those details which properly fall within the scope of the invention in its broader aspects.

Photographic slides have become a popular and acceptable medium for the display of visual information, since they are relatively simple and inexpensive to prepare, both individually and as quantity reproductions, and can be projected to any desired enlargement with good definition and excellent color rendition. Their use in education, entertainment, industrial training, advertising and similar fields is commonplace. Efforts to provide a system in which the projection of individual slides is accompanied by "synchronized" sound information have met with great difficulty, for reasons familiar to those working in this field. The usual prior approach has been the use of separate projectors and phonographs or tape reproducers, sometimes assembled in a single housing. Since separate media carry the picture and sound, automatic synchronization or complete integration of sound and picture was practically impossible.

The present invention solves the difficulty by directly and permanently associating a generous length of recorded sound (audio) information with each visually-projectable image or visual slide unit, in such a way that a properly designed projector can simultaneously reproduce both the audio and visual records of a slide unit, individually or sequentially, without any special requirement as to synchronization, the latter following inevitably from the fact of integration of the two kinds of records upon a single record unit. The combination permits the use of sound recording and reproducing techniques adapted either to the making of individual records, for limited use or special distribution, or to the economical mass production of duplicate information records for more widespread application. Moreover, the utilization of series of individual records of this kind permits easy up-dating, editorial revision or correction, or alteration of particular parts only of a sequence, and the assembly of a variety of sequences to accomplish particular objects.

In brief, the invention provides a system of the above kind in which the individual audiovisual slides consist of an optical transparency, such as a projection positive film or the like, of standard size and format, carried directly upon, or forming a part of, a sound record which preferably is of the spiral groove type for ready reproduction by a simple form of phonographic reproducer. In particular, the audiovisual record unit is employed with a reproducer of special construction and attributes that permits the record unit itself to be held stationary, while the reproducer for the sound track is rotated to achieve the necessary relative motion involved in sensing and reproducing the sound information. The satisfactory accomplishment of this combination yields important advantages for the system as a whole, among which are the elimination of requirements for expensive types of record units (such as those requiring moving parts in each unit), the relaxation of manufacturing tolerances and requirements normally associated with other audiovisual systems of comparable or inferior performance characteristics, the ease and low cost of preparing record units of even the highest quality, and others.

The invention will now be described in some detail in connection with the specific chosen embodiments thereof, reference being made to the accompanying drawings, in which:

FIGURE 1 is an exploded perspective view, partly broken away, of one preferred form of the audiovisual projection apparatus of the invention, showing the ease with which a single apparatus unit can be adapted either to cabinet projection with a moderate degree of optical enlargement of the visual image, or to full scale projection using an external projection screen.

FIGURE 1–A is a perspective view of a typical audiovisual slide for use in the system.

FIGURE 10 is a schematic wiring diagram illustrating some of the relations between mechanical and electrical parts of the first form of the projector apparatus.

Figure 2:
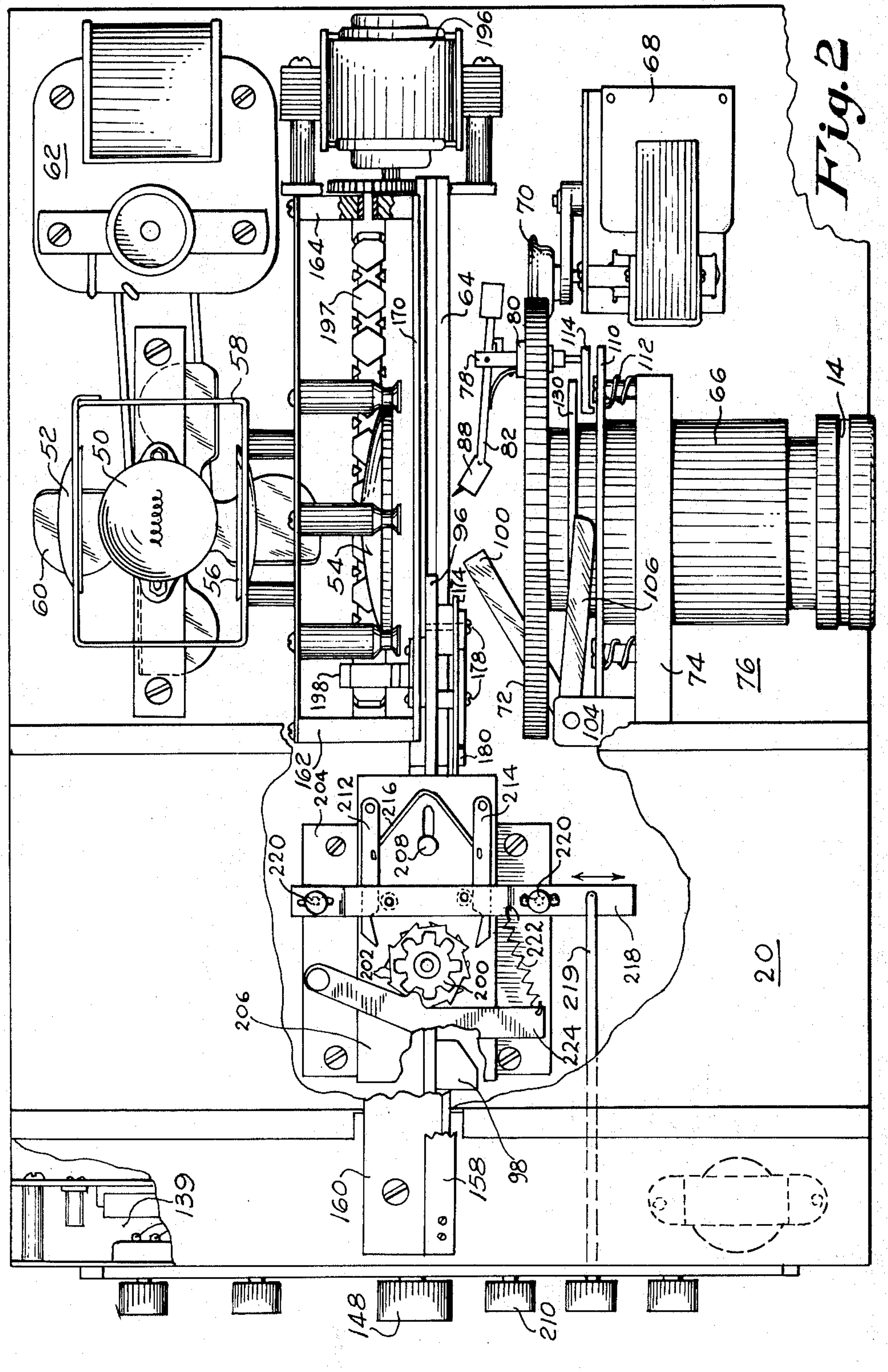
FIGURE 2 is a plan view, with parts broken away and parts in section, of the major internal chassis-mounted parts and components of the projector of FIG. 1.

FIGURE 1 illustrates in exploded perspective view one very useful and adaptable format which the novel apparatus may take, including a main projector cabinet 10 of simple rectangular configuration whose front wall includes the usual light beam projecting aperture behind which is the adjustable projection lens system 14 for throwing an enlarged visual image from a slide unit onto a screen, wall surface or the like. A loudspeaker 16 is disposed at one side of the lens opening, or may be elsewhere on the cabinet. A control panel 18 has a set of control knobs to be later described, and a fore-and-aft magazine tunnel 20 is adapted to receive an audiovisual slide magazine 22 for indexed motion to present successive slides of a series to the proper position for lateral motion into projection (and record playing) position.

To make the projector assembly relatively self-contained, and for use where large projection ratios are not desired, a screen box 24 may be provided, preferably being a four-sided box with open bottom and rear wall areas and dimensioned to be stowed snugly about the projector cabinet 10 when the equipment is not in use. The front wall of box 24 is provided with a usual form of rear-projection (diffusing) screen 26, positioned to receive a moderately enlarged projected image from lens 14 when the screen box is disposed, as shown, only slightly overlapping the front wall of the cabinet 10. In this position, the top and side walls of the screen box minimize light leakage and thereby enhance the visual contrast of the image thrown on screen 26. For wall or remote screen projection, screen box 24 is merely lifted clear, but when stowed about the cabinet 10, it may in turn be encompassed from above by the carrying cover 28, suitably dimensioned, and provided with clasps or the like to secure its side walls to the lower part of cabinet 10, and thus to provide a convenient carrying case of minimum dimensions.

As stated above, the audiovisual slide of the invention combines an optical (usually photographic) image record and a sound record. A typical form of slide unit is shown in FIGURE 1–A, the projectable image being represented by a diapositive or film 32 mounted centrally of a square (or rectangular) support 34 including a sound track, here shown as a phonographic record groove 36 arranged concentrically about the diapositive 32. A number of special features of this kind of record unit, and variations thereof, will be described below; in brief, the slide unit is held stationary in the optical path of the projector beam and its visual image is projected by the lens system 14, while the sound record of track 36 is reproduced by means of a rotating transducer or pickup of special form, also to be described.

The internal details and arrangement of the projector equipment will best be followed from a description of FIGS. 2 through 6 of the drawings. In the plan view of FIG. 2, the cabinet 10 being removed, are shown usual components of a slide projector, including lamp 50 with reflector 52 and condensers 54, 56, the latter mounted in a wall of the chimney 58. A ventilating fan 60 may be driven from a motor 62, as conventional. An audiovisual slide to be projected will be positioned in the optical axis in a plane above the location of lateral track 64, the imaging rays passing through a fixed cylindrical mount 66 whose forward (bottom) part in FIG. 2 carries the focusable projection lens 14. The slide unit is held stationary in projection position during reproduction of its sound track, this being permitted by the use of a special form of transducer mounting which rotates the sound pickup around the optical axis. Before leaving FIG. 2, reference is made to the drive motor 68 with usual spring-urged rim drive idler wheel 70 contacting the motor shaft and the rim of an annular carriage member 72 journalled upon mount 66, the latter supported by a plate 74 secured fixedly to the chassis 76.

Figures 3, 4:
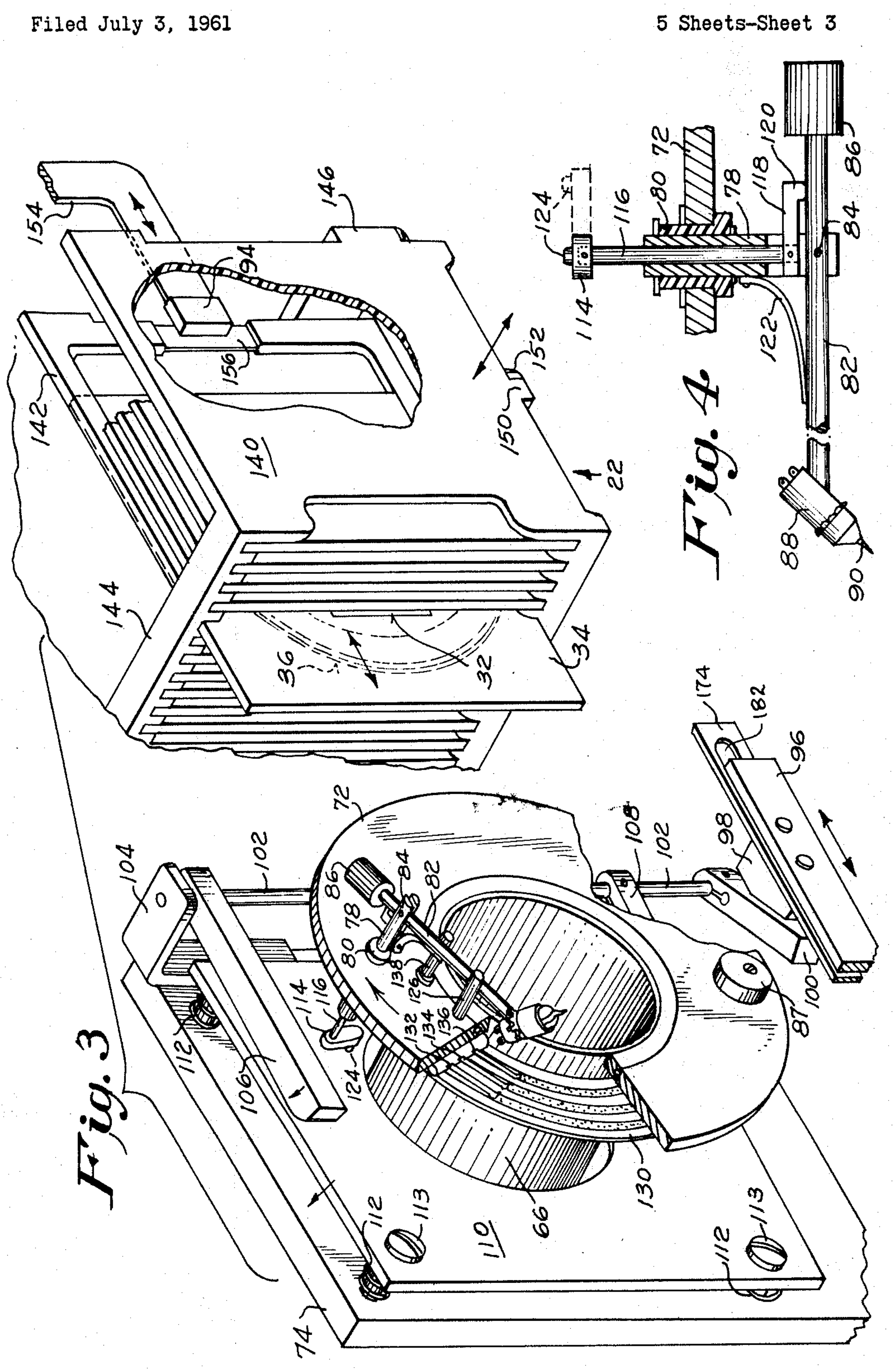
FIGURE 3 is a perspective view, to a larger scale and with parts broken away, of the essential features of the sound reproducing portions of this equipment, together with a broken perspective view of a magazine for holding and feeding slides or record units.
FIGURE 4 is a fragmentary sectional view showing details of the sound pickup arm construction.

The arrangement of parts will better be understood by turning now to FIG. 3 of the drawings, which is a perspective view of part of FIG. 2 from above and looking from the rear; that is, at the face of carriage annulus 72 that is exposed to the slide and the illuminating system. This figure shows the carriage 72 as pivotally supporting in a bearing 80 the pickup arm 82, which is also pivoted at 84 on a hollow shaft 78 projecting through bearing 80. The arm is thus free to swing in planes at right angles to one another, but it is nicely balanced, as by a counterweight 86, so as not to be influenced by gravity, or rotation of the carriage member 72 as by the drive motor 68 of FIG. 2. Counterweight 87, which is mounted on carriage member 72 substantially diametrically opposite the shaft 78, fully counterbalances the weight of the arm assembly, and this arrangement ensures the necessary smooth and uniform rotational motion of the carriage member 72.

The free end of arm 82 carries the pickup cartridge 88 (see FIG. 4) with the usual stylus 90 (when the sound is provided by a phonographic groove), which stylus can thus approach or recede from the spiral record track of audiovisual slide 34 when the latter has been propelled from the magazine 22 into playing position confronting the annular carriage 72. As will be explained in detail below, the motion of an audiovisual slide from the magazine is accomplished by a reciprocating bar having a slide-pushing end 94 connected, through certain intervening parts, to be reciprocated by a power bar 96 to which is secured a camming lug 98. When a slide has been propelled to the proper projecting position, the camming lug 98 engages and rotates a lever arm 100 secured to a vertical shaft 102, suitably journalled in brackets (such as 104) secured to the main chassis; for example, by plate 74.

Upper and lower arms 106 and 108, fastened to shaft 102, are thus rotated in the direction of the arrow on arm 106, when shaft 102 rotates, to urge in the rearward (FIG. 3) direction a control plate 110 against the light pressure of four coil compression springs 112 of which three are visible in FIG. 3. The lateral position of control plate 110 is established by four bolts or headed posts (such as 113) secured to support plate 74 already described. These posts pass within the coil springs and through clearance holes in control plate 110. The rearward (in FIG. 3) motion of the control plate removes its forward surface from engagement with the cranked tail fitting 114 secured to the rear end of a control stem 116 passing through the hollow shaft 78 in bearing 80. The forward end of stem 116 terminates in a slotted portion of shaft 78 (see FIG. 4) and is rigidly connected to an offset dog 118 whose outer tip 120 can engage the pickup arm 82. A light leaf spring 122 is secured to the shaft 78, as shown, and its free end engages pickup arm 82 to urge the arm in the counter-clockwise direction (in FIG. 4) and thus to urge stylus 90 toward the sound track face of an audiovisual slide 34 properly positioned in the axis of the projection system.

From what has been said, it is clear that when stem 116 is moved downwardly in FIG. 4, or forwardly in FIG. 3, the tip of dog 118 rotates pickup arm 82 against the force of spring 122 and will lift the cartridge stylus 90 away from the slide. Also, due to the fact that dog 118 lies in the slotted part of shaft 78, rotation of stem 116 will also rotate the shaft 78, and thus rotate the pickup arm 82 about the axis of the shaft. This motion is used to restore the stylus position to the proper radial value after the completion of the playing of a sound record, in preparation for the start of the next succeeding record. The action will be made clear by referring again to FIG. 3, with the parts, as shown, at the time when an audiovisual slide 34 is about to reach its proper position in front of carriage member 72. Before the camming lug 98 engages arm 100, the force of coil springs 112 urges control plate 110 forwardly to the limit established by bolts 113, and overcoming any light spring force that may be provided to maintain shaft 102 against idle motions. Plate 110 is thus urged against the tail fitting 114, engaging a portion thereof which is away from the axis of the stem 116 and shown as a small integral projection 124 on the fitting. The carriage member 72 is rotating in the direction of the arrow thereon, in preparation for the reproduction of the recorded sound, so the engagement of projection 124 with control plate 110 imposes a drag or torque on fitting 114 tending to turn the pickup arm 82 in the direction to bring stylus 90 to its outermost radial position, which limit is established by a stop pin or stud 126 on the carriage member. Also, the axial thrust on stem 116 causes dog 118 to move forward (in FIG. 3) and thus to maintain the pickup arm tilted (against the force of leaf spring 122) away from the audiovisual slide's surface location.

As an audiovisual slide arrives at the projection position, camming lug 98 rotates arm 100, and shaft 102 rotates arms 106 and 108 to force control plate 110 to the rear, away from fitting 114. Spring 122 is thus able to urge pickup arm 82 to place stylus 90 against the audiovisual slide surface (there is adequate overtravel of plate 110 to ensure this), and the removal of the drag surface of plate 110 from the projection 124 of the fitting leaves the shaft 78 free to rotate as the stylus enters the first (outermost or lead-in) groove of the record, which is now in playing position. Continued rotation of the carriage member 72 causes the spiral record groove to feed the pickup arm inward in the usual way.

The reverse sequence, when a record has been completed, will be obvious; under control of a command signal, the record-propelling push bar 94 commences to retract, but due to a lost-motion connection (to be described) the record itself does not move until lug 98 moves away from arm 100. Coil springs 112 are then able to move control plate 110 forward, and the engagement of its forward ("drag") surface with fitting 114 pushes stem 116 and rotates pickup arm 82 to lift the stylus from the record. At the same instant, or immediately thereafter, the drag of control plate 110 upon the off-axis projection 124 rotates the fitting 114, stem 116, and pickup arm 82 to restore the stylus from its inner-groove radius position (or the position of any leadout groove) to which it was moved by the spiral nature of the sound track, and into the outer or starting-radius position, ready for the positioning of the next record to be played.

It is desired to make the machine controllable in a self-cycling fashion, insofar as the complete projection and reproduction of each of the record units is concerned. Also, it is necessary to provide an electrical connection to the rotatable pickup device, so that its signals can be conveyed to an amplifier and reproducing device such as the loudspeaker 16. A convenient, simple and very effective arrangement is illustrated in FIG. 3, in which there is fixedly mounted about cylindrical support or mount 66 an insulated plate 130 carrying three concentric (for example, "printed") slip ring patterns cooperating conductively with respective springy contact brushes 132, 134 and 136, affixed to the rear side of carriage member 72, as by an insulated support bar. Two of the brushes are connected by flexible leads (not shown) to the pickup cartridge 88 in the known way, while the third brush is connected to a contact stud 138 mounted in carriage 72 by an insulating bushing (if 72 is conductive). This stud also acts as a limit stop for the pickup arm 82 in the direction opposite to stop pin 126, and when the stylus reaches the lead-out groove of an audiovisual slide, contact of pickup arm 82 with contact stud 138 at least momentarily connects the third slip ring to a common electrical return path. Thus the two outermost brushes may be the signal path conductors from the pickup cartridge to the amplifier 139 shown in FIG. 2. Thus the two outermost brushes 132 and 134 may be the signal path conductors from the pickup cartridge to the amplifier, while brush 136 may be connected to contact stud 138; see FIG. 10. Then brush 134 becomes the common electrical return path, and together with brush 136 forms part of the control circuit for the cycling signal or impulse.

In the arrangement described, the occurrence of a cycle of travel of the slide pusher in the record-advancing direction depends upon the fact that the pickup arm is rotated to its innermost position as the preceding record is played. If one or more blank records spaces are present in the magazine, no record will be presented to the stylus 90, and the power bar 96 will not be returned to its retracted position to proceed with the playing of records. Hence, the face of masking or aperture plate 170 (to be described) may have a blank or dummy spiral groove to artificially advance the pickup arm to its inner radius if a record is thus omitted.

FIG. 3 also illustrates schematically a preferred form of audiovisual slide magazine indicated as a whole by numeral 22, and slidable fore-and-aft through the tunnel 20 of FIG. 1. The magazine may be of metallic or, more desirably, of molded plastic construction, and includes a bottom plate and front and rear end plates, the latter designated 140 in FIG. 3, recalling that the fore-and-aft orientation of FIG. 3 is opposite to that of FIG. 1. The magazine constitutes a sort of compartmented record rack formed of a plurality of parallel rib portions 142 extending from an upper solid corner bar 144 lengthwise of the magazine to the opposite lower corner of the bottom plate and thence along the upper side of the bottom plate. The compartments so formed are open at the side facing towards the projector axis (as indicated by the partly extending audiovisual slide 34), but a lengthwise bar 146 closes the opposite side of the magazine against accidental dropping out of slides, when the magazine is properly handled. This bar 146 also connects the separator ribs, provides a slide-return stop, and one edge, the lower edge as shown in FIG. 3, is provided with rack teeth to cooperate with a magazine-indexing pinion mounted in a vertical chassis wall and connected for manual rotation by a manual knob 148 (see FIGS. 1 and 2). A similar bar extends lengthwise beneath the magazine floor, as at 150, and has a rack teeth at 152, for cooperation with another pinion for automatic magazine indexing. Slides placed between the separating ribs are ejected by a reciprocating pusher 154 having the pusher end 94 mentioned above, and which end is of enlarged width to ensure positive engagement with the edge of the relatively thin record unit. To accommodate this increased width of the pusher, the separator ribs are thinned down for a portion of their vertical extent, as at 156, providing adequate inter-rib space for the pusher without unduly weakening the ribs.

Figures 5, 6:
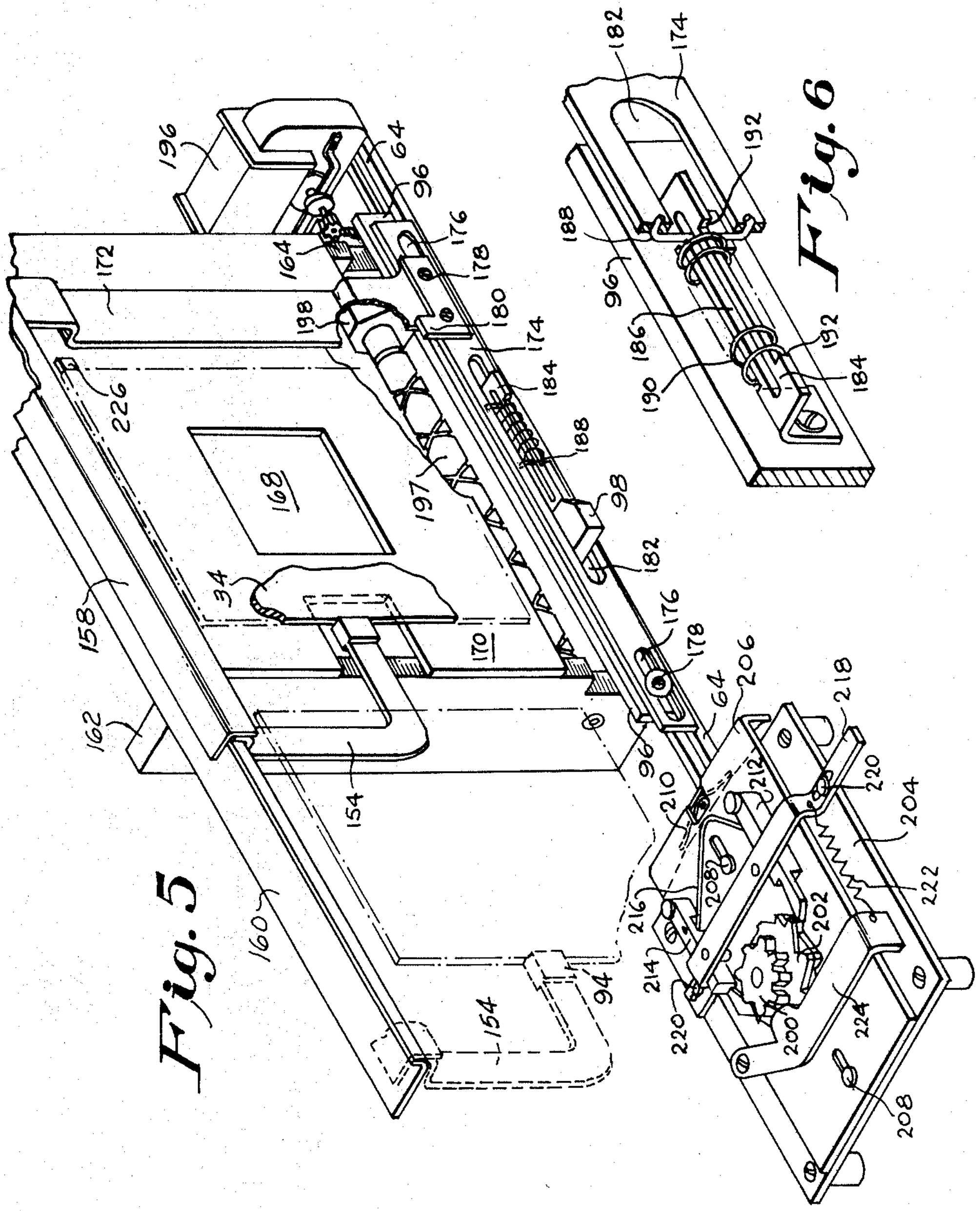
FIGURE 5 is a perspective view, also with parts broken away for clarity, of the record slide traversing drive and the indexing means for the slide-carrying magazine.
FIGURE 6 is an enlarged perspective view of a portion of the structure shown in FIGURE 5.

Proceeding with the description of the magazine operation and its automatic advance (or retractive) motion through the tunnel 20, reference is now made especially to FIGS. 5 and 6 of the drawings, which for clarity again omit parts not necessary to the understanding of these features. The slide unit pusher bar 154 has already been mentioned, and is actually an arm depending from a hanger 158 which rides along a rail 160 secured atop two rigid pillars 162, 164 based upon the main chassis. The left hand part of rail 160 extends across the top of the magazine tunnel 20 (in FIG. 1), and the side walls of the tunnel are vertically slotted to permit slide units to pass freely through the inner side wall to and from the projection position, and to permit the arm 154 to pass through both tunnel side walls. Thus, in the dash line position of hanger 158, at the left in FIG. 5, arm 154 lies outside the magazine so that nothing interferes with the fore-and-aft magazine travel; the arm in this position lying in the space between (looking at FIG. 1) the left tunnel wall and the outer wall of cabinet 10.

Pusher arm 154 pushes a slide from the magazine into projection position, with its diapositive image, film or other visual display aligned with the framing aperture 168 of a masking plate 170 secured to the pillars 162 and 164. The slides are pushed back into the magazine by a member 172 in the form of a vertical strip depending from the opposite end of hanger 158, and having a central portion bent into the plane of the edge of the slide, or beyond, to ensure pushing contact with the right edge of the slide unit when this pusher moves to the left in FIG. 5. The forwardly extending offsets of this pusher 172 above and below the central portion thereof are necessary to clear the audiovisual slide guide tracks, which may be channels defining the paths of the top and bottom edges of the slide units. Such tracks are omitted from FIG. 5 for clarity of the showing of other parts, but are secured to plate 170 and preferably have chamfered entrance formations facing the edge of the audiovisual slide at the position where it leaves the magazine, for minimum wear and positive guidance of the slides.

The lowermost extremity of pusher 172 constitutes a connection to a horizontally disposed lost-motion bar or narrow plate 174 which is connected for limited lengthwise reciprocation relative to the power bar 96. To this end, plate 174 is slotted as at 176 and received in the slots are shouldered bearing elements secured to the power bar as by screws 178 for loose relative sliding motion between these parts. At the right end of the assembly, in FIG. 5, the shouldered elements serve to connect to power bar 96 an abutment element 180 for a main purpose to be described. The abutment element also serves the loose securing function of a washer between the screws 178 and the lost-motion bar 174. A central slot 182 in the lost-motion bar passes the camming lug 98 already described in connection with FIG. 3, the lug being fixed to power bar 96. This slot 182 also passes the horizontally projecting portion 184 of an angle piece (see FIG. 6) secured to power bar 96, and slotted as at 186 to accommodate a pair of spaced vertical pins 188 that are secured to the upper and lower edges of the slot 182 of bar 174. A helical compression spring 190 is wound loosely about the angle-piece portion 184, to exert a force upon each respective pin 188 when the sliding parts so move as to urge spring 190 against the stops formed by the ends of lengthwise edge recesses 192 of the portion 184. A double-acting lost-motion connection between the power bar and the lost-motion bar is thus achieved.

Motive power for the power bar may be provided in various ways, and for purposes of illustration there is shown a reversible double-helix lead screw type of drive, similar to one shown in Shroder U.S. Patent 1,765,806. The double-helix screw 197 is journalled between the pillars 162 and 164, and connected for rotation, always in the same direction, by suitable gears and a motor 196. A travelling nut 198 engages the screw, having the usual pin or spring-urged plunger to cooperate successively with the right-hand lead screw thread and the left-hand thread. The threads are connected by transition slots at the ends of the screw, so that nut 198 will travel in a back-and-forth path upon rotation of the screw in one direction only. Such a screw greatly simplifies the drive mechanism, as no reversal of the motor, or like complications, are needed. The nut 198 is merely fastened directly to power bar 96.

It has already been mentioned that the bottom of the magazine (FIG. 3) carries a lengthwise rack 152. When positioned in the tunnel 20, and advanced sufficiently, the rack engages the teeth of a pinion 200, which, together with a pair of reversely-ratcheted toothed wheels 202, is secured to a shaft journalled in the bed plate 204 suitably carried by the main chassis, in a position underlying the tunnel 20. An aperture in the tunnel floor passes the pinion 200, but the ratchets lie beneath that floor. An operating slide 206 is mounted for limited reciprocatory motion upon bed plate 204, as by pin-and-slot mountings 208, and is apertured to clear the shaft of the pinion. This slide is urged to the right in FIG. 6 by the pressure of a bow spring 210 between bed plate 204, or its edge, and a turned-down flange of the slide. The slide carries a pair of pivoted pawls 212 and 214, urged inwardly toward their axis of symmetry, or towards engagement with the respective upper and lower ratchet wheels, by a hairpin spring 216. A cross bar 218 is mounted for limited sliding motion on bed plate 204 transversely of slide 206, by pin-and-slot mountings such as 220; an edge of one of the slots being formed as by scalloping to define three loosely-detented positions of the cross bar: a position, as shown, where neither pawl can engage its ratchet, and two positions in which the respective pawls can selectively engage their ratchets. A tension spring 222 connects cross bar 218 and one end of a pinion-detent lever 224 pivoted on the bed plate 204, holding the detent in engagement with the pinion and also holding the cross bar tensioned so that its scalloped slot edge loosely detents the cross bar positions, as described. A pair of pins spaced on the under side of the cross bar respectively hold either of the pawls, or both of them, out of ratchet-encountering positions. A manual selector knob is connected to position the cross bar 218, as by shaft 219.

Bed plate 204 is sufficiently elevated above the main chassis floor as to provide room to pass power bar 96 and lost-motion bar 174 beneath it, when those parts make their leftward excursion. Near the end of this excursion, however, the abutment element 180 engages the flange of slide 206, and moves it to the left. If one or the other pawl is positioned to engage its ratchet, the pinion 200 will be advanced a definite increment in the corresponding direction, and the magazine thereby either stepped ahead or stepped back, by an amount equal to the separation between adjacent slide units in the magazine. Note that this action can only occur after a slide has completely returned into the magazine, and with pusher 154 clear of the tunnel 20. If neither pawl can engage its ratchet, the next motion of the power bar to the right will return the same slide for repeated projection, since the magazine will not have moved after the last slide was returned. In any event, the lost-motion connection between the power bar and the lost-motion bar ensures that, at the left end of the stroke, pusher 154 clears the magazine and the tunnel before the abutment 180 can perform its magazine-indexing function. Likewise, at the right end of the stroke, the lost motion enables the audiovisual slide 34 to stop (as against stops of which one numbered 226 is shown on the masking plate 170) before the camming lug 98 allows the stylus 90 to engage the surface of the record unit or slide unit just placed in projection position. This is quite important where, as in the present combination, any dragging of the stylus could easily damage the sound groove or other record track or surface. The lost motion may also be availed of in connection with known optical shuttering of the light beam of the projector.

Automatic cycling of the magazine, and the associated functions, can readily be provided by providing position-operated switches for engagement, at the ends of travel of power bar 96, thereby to initiate the operation of motor 196 in the desired sequence. Remote control, by cabled wiring or other system, is also simple to provide; such arrangements are shown in the wiring diagram, FIG. 10.

Referring specifically to FIG. 10 power bar 96 is indicated schematically as cooperating with end-of-travel operated switches 225 at the magazine side or extremity, and 223 at the lens side or extremity. A pair of ganged three-position switches with their contacts correspondingly marked are shown as operated by manual control knob 210 (also shown in FIG. 1 on panel 18). The electrical source is indicated conventionally at 227, and in FIG. 1 by a plug bearing that number. With manual control knob 210 in the A position ("Off"), the circuit to motor 196 (which powers the bar 96) is interrupted at A. With the knob in the B position ("Load"), the motor circuit is completed through switches 225 and 223 until and unless the power bar 96 is fully at the magazine end of its travel, suitable for inserting or removing a magazine 22. With the knob 210 in the C position, switch 225 is shorted out, and motor 196 stops only when the power bar is fully at the lens extremity, for slide projection.

As the reproduction of sound from each slide is completed, switch 223 is momentarily shorted by the circuit including pickup arm 82, contact post 138 and brushes 134, 136. Bar 96 is driven by motor 196 to return the slide to the magazine, index the magazine, and present the next slide to the projection system. A manual pushbutton switch 228 allows the operator to terminate the projection and reproduction of a slide, at will, and thus perform a "reject" function.

The two knobs at the lower rear of control panel 18 in FIG. 1 may control the volume and tonal range of the amplifying system 139, while the knob just forward of switch knob 210 controls the shaft 219 (FIG. 2) for the selection between forward, reverse and repeat operations of the magazine indexing mechanism. The forward-most knob on the panel is mechanically connected to the focusing barrel of lens 14.

*Simplified Form of Apparatus*

Figure 7:
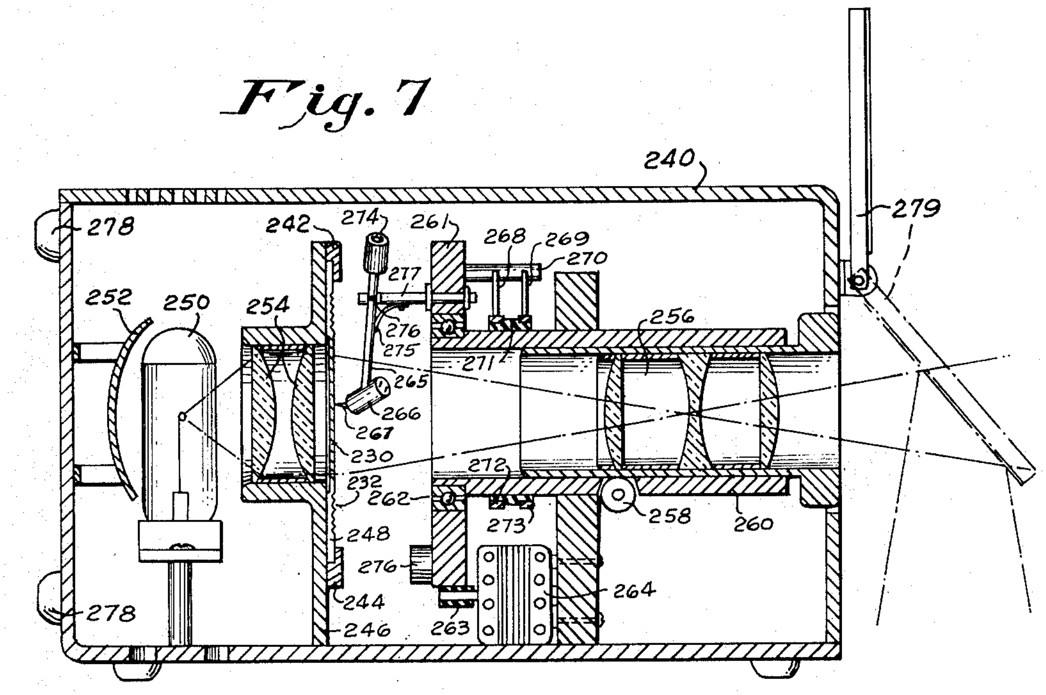
FIGURE 7 is a vertical sectional view of a second form of projector in accordance with the invention, and of generally simplified form.

In the form of the apparatus illustrated in FIG. 7, the simultaneous optical projection of a visual image, and reproduction of related audio information from an integrated audio-visual slide, is accomplished by a very simple and compact, yet highly adaptable, arrangement of mechanism. The figure shows the machine in vertical section, while FIGS. 8 and 9 show alternative typical forms which the audio-visual slides may assume.

Figure 8:
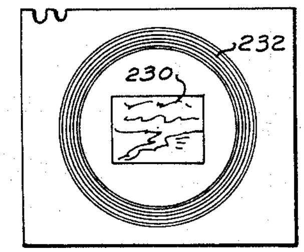
FIGURE 8 is a face view of a particular novel form of the audiovisual slide in accordance with the invention.
Figure 9:
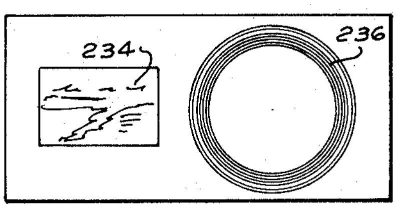
FIGURE 9 is a similar view of a modified form of audiovisual slide.

In FIG. 8, the slide is for example substantially square, and is provided at its central portion with the photographic transparency 230 carrying the visual information to be projected, and also with the sound track 232 that carries the sound information to be reproduced. The sound track may consist, for example, of a spiral phonographic groove surrounding the transparency and being centered so that the axis of the grooves substantially coincides with the center of the transparency. In the alternate form of slide shown in FIG. 9, the slide has a photographic transparency 234 centered to one side of the vertical center-line of the slide, while the sound track or grooves 236 are centered to the other side of the vertical center-line. While the apparatus of FIG. 7 is designed specifically for the projection of slides of the FIG. 8 type, those changes needed to allow the projection of the other type of slide will be apparent when the description of FIG. 7 has been understood.

The apparatus of FIG. 7 includes a housing 240 on which the parts are mounted. There are two slide guides 242 and 244 mounted on the slide support 246, and adapted to receive the slide 248 of FIG. 8 type. The optical system is largely of conventional lantern-slide type, including a projection lamp 250 in a suitable socket, a reflector 252, and condensing lenses 254 mounted between the lamp and the plane of the transparency portion of the slide. The slide support is apertured at the portion facing the transparency portion of the slide, to allow the rays from the lamp to reach the projection lens system 256, which is mounted in a focusing barrel and adapted to focus the optical image from the slide upon a suitable viewing screen, not shown, in magnified form. Numeral 258 designates a focusing control adapted to slide the lens system 256 within a stationary cylindrical member 260, which in turn is mounted to the housing by any convenient means.

The cylindrical member 260 is coaxial with the optical axis of the lamp and condenser system, and rotatably supports a carriage member 261 as by a ball bearing assembly 262, for rotation about the same axis. A rubber sleeve 263 on the shaft of a suitable electric motor 264 frictionally drives the annular carriage member 261 at the correct speed corresponding to the playback speed of the sound track on slide 248. A conventional rubber-rimmed idler wheel may preferably be interposed, in a known manner, between the motor shaft and the annular carriage member 261.

Numeral 265 designates a phonograph pickup arm having the usual cartridge 266 and its stylus 267, the cartridge being of crystal, ceramic, magnetic or other conventional type. Arm 265 is pivoted at 276 upon a shaft 277 rotatably mounted on the carriage member 261, and thus the pickup arm 265 may freely move in both the vertical and horizontal planes. One end of a spring 275 is secured upon the pivotal supporting shaft 277, while the other end of the spring biases the arm 265 in such a way as to urge the stylus 267 against the sound track 232 of the slide 248.

The two terminals of the cartridge are connected by wires, not shown, to two contact brushes 268 and 269 mounted on an insulative post 270 which is supported on, and rotates with, the carriage member 261. Designated 271 is a slip ring assembly mounted on the stationary cylindrical member 260, and comprising an insulating body carrying two contact rings 272 and 273, each being always in electrical contact with its corresponding contact brush. When the cartridge has more than two terminals, such as a stereophonic cartridge, a corresponding number of lead wires, brushes and contact rings will be provided. The contact rings are connected by means of conductors, not shown, to a conventional sound channel, having an amplifier, loudspeaker and the like, of usual form.

In operation, the carriage member 261 is rotated upon the energization of the motor 264, the stylus 267 is engaged in the phonographic grooves of the side 248, electric signals are created in the cartridge 266, and are transmitted through the brushes and slip rings to the amplifier, and reproduced by the associated loudspeaker. Simultaneously, the lamp 250 is energized to send light rays through the condensing lenses and thus illuminate the transparency portion 230, the rays from the transparency being focused by the projection lens system 256 onto the viewing screen. Simultaneous audio and visual information from the slide is thus reproduced.

It is to be noted that the apparatus as just described, and illustrated in FIG. 7, may be operated with its optical axis lying in a horizontal plane, a vertical plane, or indeed in any direction whatsoever. For this purpose, a counterweight 274 balances the pickup arm 265 and the weight of the cartridge completely, while a counterweight 276 mounted on the rotatable carriage member 261, and substantially diametrically opposite to the pickup arm shaft 277, counterbalances the weight of the arm assembly, assuring the necessary smooth and uniform rotational speed of the carriage member 261.

In view of the foregoing, the housing 240 is provided with a set of rubber legs or the like on two perpendicular surfaces thereof, as shown. In the position illustrated in FIG. 7, the optical projection axis is horizontal for use with a vertical screen, wall or the like. Alternatively, the housing 240 may be turned up to sit on the legs 278, with the optical axis inside the housing in a vertical position. In the latter case, projection upon a vertical screen can still be accomplished by the use of a swinging reflector 279, which is otherwise swung out of the path of the rays.

The modifications needed to accommodate an audio-visual slide of the type shown in FIG. 9 mainly concern the support 246, which will be so constructed as to permit the optical path to be aligned with the transparency and laterally adjacent, instead of coaxial with, the carriage member 261, to conform to the spacing between the sound track and the photographic transparency.

While phonographic sound tracks have been implied in the above description, it must be once more emphasized that magnetic, photographic, or other types of sound tracks may be employed, within the spirit of the present invention.

In using the term "sound record," it is not intended to exclude the use of signals of subsonic and supersonic frequencies capable of carrying sound information, or other information such as control signals or the like. The term "sound pickup" or the like is likewise intended to cover all types of mechanical, optical or magnetic transducers suitable for the purpose.

This application is a continuation-in-part of our co-pending application Serial No. 811,083, filed in the U.S. Patent Office on May 5, 1959, entitled "Audio-Visual Projector for Sound-on-Slide Tablets."

What is claimed is:

1. Combined sound and picture reproducing apparatus for use with an audiovisual slide having a picture and a sound groove spirally disposed about said picture, comprising: optical picture projecting means including a support for locating the picture of such a slide in centered position relative to the optical axis thereof, a rotatable sound pickup carrier mounted for rotation about the optical axis, a sound pickup mounted on said carrier for radial movement in one radial sense relative to the optical axis in response to the spiral driving force of the slide sound groove during reproduction of the sound recorded therein, means for biasing said pickup in the axial direction towards the sound groove of a slide held by said support, and means for withdrawing said pickup from said sound groove against the force of its biasing means and for concomitantly moving the pickup relative to said optical axis in the opposite radial sense, in preparation for a succeeding sound reproducing operation.

2. Combined sound and picture reproducing apparatus for use with an audiovisual slide having a picture and a sound track spirally disposed on such slide, comprising: optical picture projecting means including a support for locating the picture of such a slide in centered position relative to the optical axis thereof, a rotatable sound pickup carrier mounted for rotation about the central axis of said sound track, a sound pickup mounted on said carrier for radial movement in one radial sense relative to the central axis of said sound track during reproduction of the sound recorded in said track, means for biasing said pickup in the axial direction towards the sound track of a slide held by said support, and means for withdrawing said pickup from said sound track against the force of its biasing means and for concomitantly moving the pickup relative to said central axis in the opposite radial sense, in preparation for a succeeding sound reproducing operation.

3. Combined sound and picture reproducing apparatus for use with an audiovisual slide having a picture and a generally circular sound track disposed adjacent said picture, comprising: optical picture projecting means including a support for locating the picture of such a slide in the optical axis thereof, a rotatable sound pickup mounted for rotation about the central axis of the sound track, means for advancing and thereafter retracting such a slide to and from a working position on said support, and means controlled by the operation of the last-named means for moving said sound pickup into and out of operative positions relative to said sound track.

4. Combined sound and picture reproducing apparatus for use with an audiovisual slide having a picture and a spiral sound track disposed about said picture, comprising: optical picture projecting means including a support for locating the picture of such a slide in the optical axis thereof, a rotatable sound pickup mounted for rotation about the central axis of the sound track, means for advancing and thereafter retracting such a slide to and from a working position on said support, and means controlled by the operation of the last-named means for moving said sound pickup into and out of operative positions relative to said sound track.

5. Apparatus in accordance with claim 4, including a magazine for supporting a plurality of such slides, and means for indexing said magazine stepwise to present the slides therein, in succession, to said advancing and retracting means.

6. Apparatus in accordance with claim 5, including means responsive to the termination of the sound-reproducing operation for initiating the operation of said indexing means.

7. Combined sound and picture reproducing apparatus for use with an audiovisual slide having a picture and a spiral sound track disposed adjacent said picture, comprising: optical picture projecting means, a rotatable sound pickup carrier mounted for rotation about the central axis of the sound track of such a slide when in sound-reproducing position, a sound pickup, compound pivot means for mounting said pickup on said carrier for pivotal motion about mutually perpendicular axes of which one is always parallel to the rotation axis of said carrier, said carrier being rotationally balanced about the central axis of said sound track, and said pickup being rotationally balanced about all of its pivot axes.

8. Apparatus in accordance with claim 7, said compound pivot means including a shaft passing through said pickup carrier, and means disposed in said shaft for controlling the movements of said pickup about said mutually perpendicular axes.

9. Apparatus in accordance with claim 8, in which said shaft is a hollow shaft, a stem passing through said hollow shaft and having a part engageable with said pickup to control its position relative to said slide, and means engageable with a portion of said stem lying on the side of said carrier opposite to said pickup for operating said stem without interfering with the rotation of said carrier.

10. Apparatus in accordance with claim 9, in which the means engageable with a portion of said stem comprises a reciprocable control plate movable toward and away from said stem, and always parallel to the plane of rotation of said carrier.

11. Apparatus in accordance with claim 7, said compound pivot means including a hollow shaft journalled in said carrier, a stem passing through said shaft and supported therein for limited reciprocative motion therein, means keying said stem to said shaft for rotational control of said shaft, and a crank fitting on the end of said stem projecting beyond said carrier on the side opposite said pickup; whereby movement of a control surface into engagement with said fitting produces both rotating and sliding movements of said stem to control the pivotal movements of said pickup.

References Cited in the file of this patent

UNITED STATES PATENTS

| | | |
|---|---|---|
| 1,913,913 | Boularan et al. | June 13, 1933 |
| 2,455,712 | Von Soden | Dec. 7, 1948 |
| 2,925,753 | Schwartz et al. | Feb. 23, 1960 |
| 3,001,444 | Castedello et al. | Sept. 26, 1961 |
| 3,057,255 | Bregman | Oct. 9, 1962 |